United States Patent [19]
Yoshiga

[11] Patent Number: 4,556,193
[45] Date of Patent: Dec. 3, 1985

[54] MOTOR-DRIVEN EXPANSION VALVE

[75] Inventor: Kenji Yoshiga, Funabashi, Japan

[73] Assignee: Fuji Koki Manufacturing Co., Ltd., Tokyo, Japan

[21] Appl. No.: 654,687

[22] Filed: Sep. 26, 1984

[30] Foreign Application Priority Data

Sep. 30, 1983 [JP] Japan .............................. 58-151912[U]
Sep. 30, 1983 [JP] Japan .............................. 58-151913[U]
Jan. 28, 1984 [JP] Japan .............................. 59-10805[U]

[51] Int. Cl.$^4$ ...................... F16K 31/02; F16K 31/44
[52] U.S. Cl. ................................ 251/129.11; 251/248; 251/273
[58] Field of Search ............... 251/248, 133, 264, 273, 251/86; 62/528, 222, 225

[56] References Cited

U.S. PATENT DOCUMENTS

| 290,450 | 12/1883 | Medden | 251/86 X |
| 702,342 | 6/1902 | Clough | 251/248 X |
| 1,934,314 | 11/1933 | Lawler | 251/86 |
| 3,464,227 | 9/1969 | Matthies | 62/225 |
| 3,577,743 | 5/1971 | Long | 62/225 X |

FOREIGN PATENT DOCUMENTS 151912 9/1983 Japan .
151913 9/1983 Japan .
10805 1/1984 Japan .

Primary Examiner—William E. Wayner

[57] ABSTRACT

A motor-driven expansion valve comprises a valve casing having a first passage, a second passage, and a communication passage having a valve seat and permitting the first passage to communicate with the second passage, a valve member provided within the valve casing and movable toward and away from the valve seat, bellows covering the area between the valve member and the valve casing and urging the valve member away from the valve seat, a drive screw disposed substantially in alignment with the valve member and threaded into the valve casing such that, by its rotational movement, it is moved in the same direction as the valve member to cause the valve member to be moved toward and away from the valve seat, a motor, a drive gear to which a rotational force is transmitted from the output shaft of the motor, and a driven gear which is concentrically mounted on the drive screw to be rotated with the drive screw and which meshes with the drive gear to receive the rotational force from the drive gear.

3 Claims, 3 Drawing Figures

MOTOR-DRIVEN EXPANSION VALVE

BACKGROUND OF THE INVENTION

This invention relates to an expansion valve operated by a motor.

An expansion valve of this type is disclosed, for example, in Japanese Utility Model Disclosure (Kokai) No. 58-9577. In this motor-driven expansion valve, a valve member is threadably mounted concentric with a rotor and, when the rotor is rotated in one or the other direction, the valve member is moved toward and away from a valve seat.

In this motor-driven expansion valve, while the distance between the valve member and the valve seat is kept constant with the rotor at a standstill, the flow of a coolant through the valve seat varies in its direction to cause a variation of the coolant pressure which is loaded onto the valve member. In this case, the valve member is somewhat displaced relative to the valve seat due to a clearance in the threaded portion of the rotor and valve member. That is, when the coolant flows through the valve seat in one or the other direction, the same distance is not obtained between the valve member and the valve seat even if the output shaft of the motor has the same rotational angle. It is therefore not possible to precisely control the coolant flow when the coolant in the motor-driven expansion valve flows in one or the other direction.

This type of a motor-driven expansion valve is also disclosed in Japanese Patent Disclosure (Kokai) No. 57-186681. In this motor-driven expansion valve, a rotational force is transmitted from the output shaft of the motor through a gear train to the output shaft of the gear train. In a valve casing including fluid passages and valve seat, a valve member is threaded to the valve casing such that it is in alignment with the output shaft of the gear train. A hole of a square cross-sectional configuration is formed at the rotational center of that end face of the valve member which is remote from the valve seat. The output shaft of the gear train which has a corresponding square cross-sectional area is inserted through the hole of the valve member. When the valve member is rotated in one or the other direction through the output shaft of the gear train, the valve member is moved toward and away from the valve seat, while at the same time the inner wall face of the valve member hole is slidable relative to the output shaft of the gear train along the longitudinal axis of the output shaft of the gear train.

In the motor-driven expansion valve of Japanese Patent Disclosure (Kokai) No. 57-186681, it is necessary to make the length of the output shaft of the gear train and depth of the hole of the end face of the valve member longer than the distance over which the valve member is moved and it is also necessary to make the longitudinal axes of the output shaft and said hole coincide with design-predictable rotational axes thereof. Thus, the greater the distance of the movement of the valve member, that is, the greater the length of the output shaft of the gear train and depth of the hole of the end face of the valve member, the more difficult it is to make the longitudinal axis of the output shaft of the gear train coincide with a design-predictable output shaft of the gear train and the more difficult it is to make the longitudinal axis of the hole in the end face of the valve member coincide with a design-predictable longitudinal axis of the hole. Such a difficulty in manufacture also involves a higher cost.

SUMMARY OF THE INVENTION

The object of this invention is to provide a motor-driven expansion valve which can prevent an unauthorized relative displacement of a valve member to a valve seat even if the flow of a coolant through the valve seat varies in its direction during the time period in which a distance between the valve member and the valve seat is kept constant with the output shaft of a motor at a standstill, that is, which can precisely control the flow of the coolant in exact proportion to the above-mentioned distance even if the flow of the coolant through the valve seat is in one or the other direction, whereby it is possible to readily manufacture the motor-driven expansion valve at a low cost.

The object of this invention is achieved by a motor-driven expansion valve comprising a valve casing having a first passage, a second passage and a communication passage having a valve seat and permitting the first passage to communicate with the second passage; a valve member disposed within the valve casing such that it is movable toward and away from the valve seat; means for urging the valve member in a direction away from the valve seat; a drive screw disposed substantially in alignment with the valve member and threaded into the valve casing such that, by its rotational movement, it is moved in the same direction as the valve member to permit the valve member to be moved toward and away from the valve seat; a motor; a drive gear to which a rotational force is transmitted from the output shaft of the motor; and a driven gear which is concentrically mounted on the drive screw to be rotatable with the drive screw and which meshes with the drive gear to receive a rotational force from the drive gear.

In the arrangement of the motor-driven expansion valve described above, the urging means normally urges the valve member away from the valve seat. Even if the flow of the coolant through the valve seat varies in its direction during the time period in which the distance between the valve seat and the valve member is kept constant with the output shaft of the motor at a standstill there is no unauthorized relative displacement of the valve member to the valve seat due to a clearance in the threaded portion where the valve member is threaded into the valve casing. When the flow of the coolant through the valve seat is in one or the other direction, the rotational angle of the output shaft of the motor is in exact proportion to the distance over which the valve member is moved toward or from the valve seat. It is therefore possible to accurately control the flow of the coolant.

The rotational force is transmitted from the output shaft of the motor to the drive screw by intermeshing the drive gear with the driven gear. It is therefore possible to obviate the necessity of making the longitudinal length of the output shaft and hole of a square cross-section equal to at least the distance of the movement of the valve member and the longitudinal axes of the output shaft and hole coincide with the design-predictable longitudinal axes thereof, as encountered in the conventional motor-driven expansion valve. It is therefore possible to readily manufacture the motor-driven expansion valve at a low cost.

In the motor-driven expansion valve of this invention, the drive gear may be concentrically fixed to the output shaft of the motor and the driven gear may be fixed to the drive screw and may be slidable relative to the tooth face of the drive gear in the direction of the movement of the valve member when the drive screw is moved in the direction of the movement of the valve member.

According to this invention, a simpler, rotational force transmission system can be provided in the transmission of the rotational force from the output shaft of the motor to the drive screw through the intermeshing of the drive gear with the driven gear. It is therefore possible to manufacture a motor-driven expansion valve at a lower cost.

In the motor-driven expansion valve according to this invention, the drive gear may be concentrically fixed to the output shaft of the motor. Also, the drive screw may include a portion having a polygonal cross-section, and the driven gear may have a hole of a polygonal cross-sectional configuration at its own rotational center through which the polygonal cross-sectional portion of the drive screw is inserted to permit a rotational force to be transmitted from the output shaft of the motor to the drive screw. The hole is slidable relative to the polygonal cross-sectional portion of the drive screw in the direction of the movement of the valve member. The valve member may have a means for preventing the movement of the driven gear in the direction of the movement of the valve member. Since the driven gear is not of the type that can be moved with the drive screw, relative to the drive gear in the direction of the movement of the valve member, it is not necessary to precisely set the position of the output shaft of the motor relative to the drive screw. As a result, it is possible to very efficiently transmit a rotational force from the drive gear to the driven gear. Thus, it is possible to operate the motor-driven expansion valve with a desired performance.

Furthermore, the urging means may have a bellows connected at one end to the valve member, and at the other end to the valve casing.

The bellows prevents the leakage of a coolant, which flows from the first passage through the communication passage to the second passage, to the outside through a gap between the valve casing and the valve member.

In the motor-driven expansion valve of this invention, it is preferable that the end face of the drive screw, which is in contact with the valve member, have a pointed geometrical configuration. And it is also preferable that one end portion of the valve member, which includes the end face which is in contact with the above-mentioned pointed end face of the drive screw, be detachably mounted with respect to the rest of the valve member. It is desirable that the above-mentioned pointed end face of the drive screw and the one end portion of the valve member be formed to be relatively hard.

In such an arrangement, the drive screw permits a smooth rotating contact with the valve member over a relatively long period of time without relatively high friction. The exact control of the small flow of the coolant can be effected over a relatively long period of time.

The embodiments of this invention will be explained below by referring to the accompanying drawings.

DETAILED DESCRIPTION OF THE PREFERRED EMBODIMENTS

Figure 1:
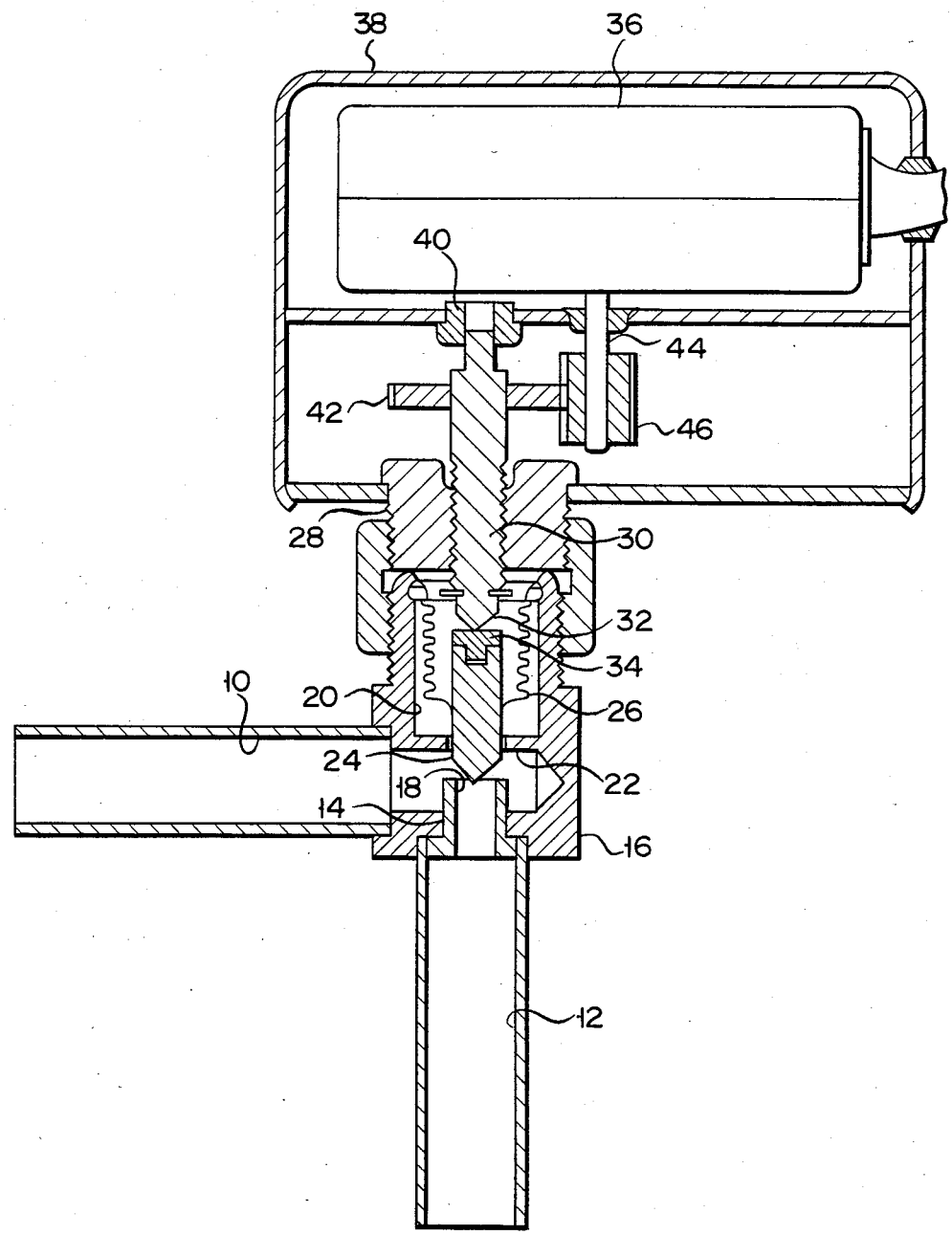
FIG. 1 is a longitudinal cross-section showing a motor-driven expansion valve according to a first embodiment of this invention.

FIG. 1 shows a motor-driven expansion valve according to a first embodiment of this invention, which is used in an apparatus utilizing, for example, a refrigerating cycle and which includes a valve casing 16 having a first passage 10 connected at one end to a first heat exchanger not shown, a second passage 12 connected at one end to a second heat exchanger not shown and a communication passage 14 for permitting the other end of the first passage 10 to communicate with the other end of the second passage 12. A valve seat member equipped with a valve seat 18 is detachably mounted to the communication passage 14.

A valve chamber 20 is formed within the valve casing 16 and separated from the passages 10, 12 and 14 by a partition wall 22 which confronts the valve seat 18.

A valve member 24 is arranged within the valve chamber 20 such that one end portion thereof extends through a hole in the partition wall 22 toward the neighborhood of the valve seat 18 to permit the one end portion of the valve member 24 to confront the valve seat 18. The valve member 24 is supported by the hole in the partition wall 22 to be able to move toward and away from the valve seat 18. In this embodiment, the valve member 24 is moved vertically toward and away from the valve seat 18 through the hole in the partition wall 22.

Between the other end portion of the valve member 24 in the valve chamber 20 and the inner wall surface of the valve chamber 20 are covered by bellows 26 which is connected at one end to the other end portion of the valve member 24 and at other end to the inner wall surface of the valve chamber 20. The bellows 26 prevents coolant in the first passage 10, communication passage 14, and second passage 12 from flowing from an opening of the valve chamber 20 to the outside of the valve chamber 20 through the hole in the partition wall 22 and serve also as an urging means for urging the valve member 24 in a direction away from the valve seat 18.

The opening of the valve chamber 20 of the valve casing 16 is closed by a cap 28 which is, for example, detachably and threadably attached to the valve casing 16. A drive screw 30 is threaded into the cap 28 and located in alignment with the valve member 24, i.e., concentric with the valve member 24. The drive screw 30, upon being rotated, moves in the direction of the valve member 24, in this embodiment, in the up or down direction in FIG. 1.

The end face 32 of the drive screw 30 which is in contact with the valve member 24, the lower end in FIG. 1 in this embodiment, has a pointed geometrical configuration, a conical configuration in this embodiment. One end portion 34 of the valve member 24, which includes an end face which is in contact with the pointed end face 32 of the drive screw 30 is formed independent of the rest portion of the valve member 24 such that the one end portion 34 is removably attached to the rest portion of the valve member 24. This removable attachment is effected, as shown in FIG. 1, by inserting a projection formed on the one end portion 34 into a mating recess of the rest portion of the valve member 24. It is desirable that the projection and the mating recess be located concentric with the rotation axis of the drive screw 30.

In order to prevent the wear of the conical end face 32 of the drive screw 30 and one end portion 34 of the valve member 24 due to their frictional contact, they are formed by quenching so as to provide a relatively high degree of hardness thereto. A motor casing 38 is attached to the cap 28 and a motor 36, for example a stepping motor, is housed into the motor casing 38. The other end portion (the upper end portion in FIG. 1 in this embodiment) of the drive screw 30, which is remote from the valve member 24, extends up into the motor casing 38. Said other end portion of the drive screw 30 is supported by a bearing 40 such that it is freely movable in the radial and thrust directions. A driven gear 42 is concentrically secured to the other end portion of the drive screw 30. The driven gear 42 may be made, together with the drive screw 30, in one piece by using the same material or may be secured by a known securing means such as welding or brazing to the drive screw 30 after it has been formed independent of the drive screw 30.

The rotation axis of an output shaft 44 of the motor 36 is located parallel with that of the drive screw 30 and a drive gear 46 is concentrically fixed to the output shaft 44. The width of the drive gear 46, that is, the dimension measured in the direction of the rotation axis and the dimension measured in the vertical direction in FIG. 1, is greater than the distance of the movement of the valve member 24.

The operation of the motor-driven expansion valve according to the first embodiment of this invention will be explained below.

When the output shaft 44 of the motor 36 is rotated in one direction, the rotation force is transmitted from the output shaft 44 to the drive screw 30 through the drive gear 46 and driven gear 42, causing the drive screw 30 to be rotated in one direction to permit the valve member 24 to be moved toward the valve seat 18, i.e., in the down direction in FIG. 1. The valve member 24 is pressed down by the drive screw 30 and moved toward the valve seat 18 against an elastic force of the bellows 26, causing a decrease in the flow of the coolant which passes through the valve seat member, i.e., the communication passage 14.

In order to increase the flow of the coolant through the valve seat member, i.e., the communication passage 14, the output shaft 44 of the motor 36 is rotated in the other direction and the drive screw 30 is also rotated in the other direction. The drive screw 30 is moved away from the valve seat 18. At this time, the valve member 24 follows the movement of the drive screw 30 under the elastic force of the bellows 26 and is moved away from the valve seat 18 to permit the flow of the coolant through the valve seat member, i.e., the passage 14, to be increased.

Where the coolant flows from the first passage 10 to the second passage 12 while a distance between the valve seat 18 and the valve member 24 is held constant with the rotation of the output shaft 44 stopped, the coolant pressure presses the bellows 26, urging the valve member 24 away from the valve seat 18. As a result, the valve member 24 is stopped in such a manner that it normally contacts with the drive screw 30.

Where, on the other hand, the coolant flows from the second passage 12 to the first passage 10 while the distance between the valve seat 18 and the valve member 24 is held constant with the rotation of the output shaft 44 stopped, the valve member 24 is moved away from the valve seat 18 under the elastic force of the bellows 26 and under the coolant pressure loaded onto the end face of the valve member 24 which confronts the valve seat 18. As a result, the valve member 24 stops its movement in a manner that its normally contacts with the drive screw 30.

Even if the coolant flows in either direction, the valve member 24 stops its movement in a manner to normally contact with the drive screw 30, the rotation angle of the output shaft 44 is in exact proportion to the distance between the valve member 24 and the valve seat 18, permitting an exact control of the flow of the coolant.

A motor-driven expansion valve according to a second embodiment of this invention will be explained below by referring to FIGS. 2 and 3 conjointly.

In this embodiment, the same reference numerals are employed to designate the same parts or elements shown in the first embodiment of this invention and any further explanation about those parts or elements is omitted.

Figure 3:
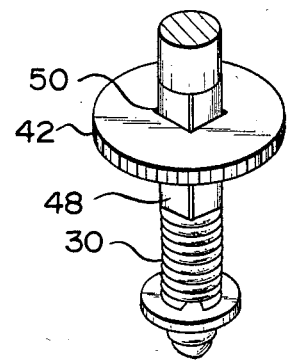
FIG. 3 is an expanded, perspective view showing only a drive screw and driven gear of the motor-driven expansion valve of FIG. 2.

In this embodiment, the other end portion of the drive screw 30 within a motor casing 38 has a polygonal configuration, such as a square configuration, in a cross-section as shown in FIG. 3, except for that part in sliding contact with a bearing 40. That polygonal cross-sectional portion 48 is inserted into a hole 50 of a polygonal configuration, such as a square configuration, which is formed at the rotational center of a driven gear 42. The dimension and configuration of the cross-section of the hole 50 are substantially the same as those of the polygonal cross-sectional portion 48 of the drive screw 30. Therefore, the driven gear 42 is rotatable with the drive screw 30 and shiftable relative to the polygonal cross-sectional portion 48 of the drive screw 30 along the rotational axis of the drive screw 30, i.e., in the direction of the movement of the valve member 24. The length of the polygonal cross-sectional portion of the drive screw 30 as measured along the rotational axis is greater than the distance of the movement of the valve member 24.

Figure 2:
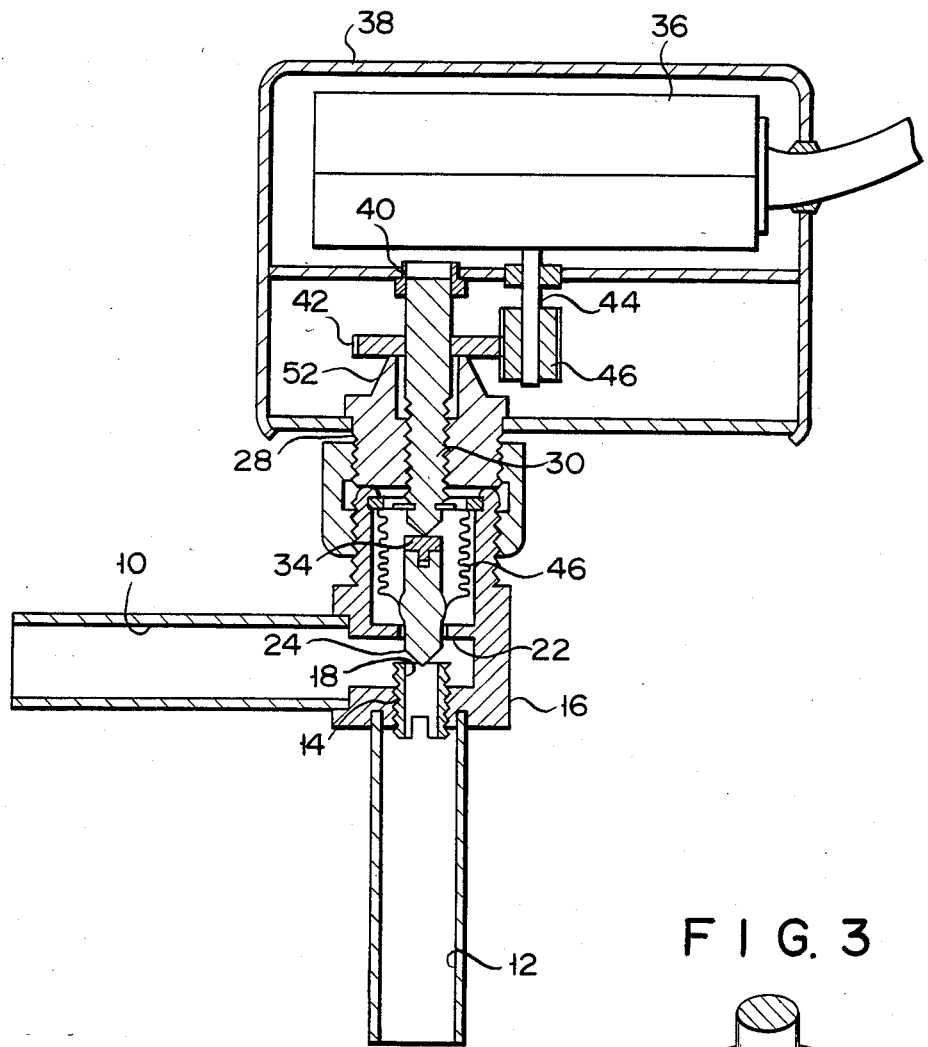
FIG. 2 is a longitudinal cross-section showing a motor-driven expansion valve according to a second embodiment of this invention.

In this embodiment, an annular portion 52 of a cap 28 which is located around the drive screw 30 extends toward the driven gear 42 as shown in FIG. 2 and is in contact with the driven gear 42.

In the motor-drive expansion valve according to the second embodiment of this invention, a rotation force is transmitted from an output shaft 44 of a motor 36 through a drive gear 40 and driven gear 42 to the drive screw 30, causing the valve member 24 to be moved. In this case, the driven gear 42 in contact with the annular portion 52 of the cap 28 is slidable relative to the polygonal cross-sectional portion 48 of the drive screw 30, and is not moved, together with the drive screw 30, in the direction of the movement of the valve member 24. The driven gear 42 need not be moved in the direction of the rotational axis of the drive gear 46 when the drive screw 30 is to be moved to cause the valve member 24 to be moved. Therefore, the rotational force can be effectively transmitted from the drive gear 46 to the driven gear 42 without relatively strictly setting a relative position of the output shaft 44 of the motor 36 and the drive screw 30. It is thus possible to operate the motor-driven expansion valve with a desired performance.

In the manufacture of the drive screw 30 and driven gear 42, a relatively precisely manufacturing control is required to make the longitudinal axis of a drive screw 30 coincide with a design-predictable longitudinal axis of the drive screw 30. Since, according to this invention, the driven gear 42 has only a relatively small dimension along the rotational axis thereof, no relatively precisely manufacturing control is required to make the central axis of the hole 50 of the driven gear 42 coincide with the rotational axis of the driven gear 42.

What is claimed is:

1. A motor-driven expansion valve comprising:
   a valve casing having a first passage, a second passage, and a communication passage having a valve seat and permitting the first passage to communicate with the second passage;
   a valve member provided within the valve casing and movable toward and away from the valve seat;
   urging means for urging the valve member away from the valve seat;
   a drive screw disposed substantially in alignment with the valve member and threaded into the valve casing such that upon rotational movement said drive screw is moved in the same direction as the valve member to cause the valve member to be moved toward and away from the valve seat, said drive screw having a polygonal cross-sectional portion;
   a motor having an output shaft;
   a drive gear fixed to and concentric with said output shaft of said motor;
   a driven gear which is concentrically mounted on said drive screw, said driven gear having a hole of a polygonal cross-sectional configuration through which the polygonal cross-sectional portion of said drive screw is inserted to transmit rotational force from said output shaft of said motor to said drive screw, and being slidable relative to the polygonal cross-sectional portion of said drive screw in the direction of movement of said valve member; said valve casing having means for preventing the movement of the driven gear in the direction of movement of the valve member.

2. A motor-driven expansion valve according to claim 1, in which said urging means has bellows having one end connected to said valve member and another end connected to said valve casing.

3. A motor-driven expansion valve according to claim 1, in which said drive screw has an end face in contact with said valve member, said end face having a pointed geometrical configuration; one end portion of said valve member having an end face which is in contact with said pointed end face of said drive screw, said end portion being detachably mounted with respect to said valve member; and said end face of said drive screw and said one end portion of said valve member being relatively hard.

* * * * *